United States Patent
Kim

(10) Patent No.: US 7,391,683 B2
(45) Date of Patent: Jun. 24, 2008

(54) APPARATUS AND METHOD FOR DETECTING TILT OF DISC

(75) Inventor: Sang-whook Kim, Chuncheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 10/849,905

(22) Filed: May 21, 2004

(65) Prior Publication Data

US 2004/0252598 A1 Dec. 16, 2004

(30) Foreign Application Priority Data

Jun. 14, 2003 (KR) .................. 10-2003-0038522

(51) Int. Cl.
*G11B 7/00* (2006.01)
(52) U.S. Cl. .................... 369/44.32; 369/53.3
(58) Field of Classification Search ............. 369/44.32, 369/44.26, 53.19, 53.14, 53.13, 53.12, 53.1, 369/53.22, 275.3, 47.1, 47.27, 47.28, 53.3
See application file for complete search history.

(56) References Cited

U.S. PATENT DOCUMENTS

| 6,137,754 | A | 10/2000 | Furukawa et al. |
| 6,282,161 | B1 * | 8/2001 | Son et al. ................. 369/53.19 |
| 6,363,039 | B2 | 3/2002 | Hayashi et al. |
| 6,842,414 | B1 * | 1/2005 | Park ........................ 369/53.19 |

OTHER PUBLICATIONS

Notice of Office Action issued by the Korean Patent Office on Mar. 16, 2005, during examination of Application No. 10-2003-0038522.

* cited by examiner

*Primary Examiner*—Nabil Hindi
(74) *Attorney, Agent, or Firm*—Staas & Halsey LLP

(57) ABSTRACT

An apparatus and a method for reducing a lead-in time of a disc, on which data is always recorded, and detecting exactly a tilt of the disc. The apparatus includes a pickup, and a system controller. Even if the disc is a blank disc which is devoid of user data, control data is recorded on the disc. The pickup can record data on the disc or reproduce data from the disc. If a seek command is received, the system controller detects the tilt of the disc once in each of a plurality of zones while the pickup is moving.

13 Claims, 2 Drawing Sheets

APPARATUS AND METHOD FOR DETECTING TILT OF DISC

CROSS-REFERENCE TO RELATED APPLICATIONS

This application claims the priority of Korean Patent Application No. 2003-38522, filed on Jun. 14, 2003, in the Korean Intellectual Property Office, the disclosure of which is incorporated herein by reference.

BACKGROUND OF THE INVENTION

1. Field of the Invention

The present invention relates to an apparatus and method for detecting tilt of a disc, and more particularly, to an apparatus and method for detecting tilt of a disc on which data is recorded.

2. Description of the Related Art

A digital versatile disc-recordable/rewritable (DVD-R/RW), is one example of a disc type on which data is recorded. Even if a DVD-R/RW is a blank disc that is devoid of user data, the DVD-R/RW records data in a control data zone.

Conventional tilt detection for a disc, such as the DVD-R/RW, is performed in 3 steps during a lead-in operation of the disc. First, a rough tilt at an inner area of the disc is detected using a difference between signals where low-pass filtering of focus driving (focus of drive: FOD) signals detected from the inner area of the disc has been performed. Second, while tilt of the disc is being corrected using the rough tilt detected in the first step, a position where a jitter is minimum is detected using an RF signal of the control data zone, and a tilt at the position where the jitter is minimum is detected as a fine tilt at the inner area of the disc. Third, the total area of the disc is divided into five zones, and a tilt of each zone is detected using a difference between signals where low-pass filtering of the FOD signals has been performed as in the first step, while a pickup is moved through each of the zones. Since the tilt of the disc is detected in three steps during a lead-in operation of a disc, the lead-in operation of the disc is very time consuming.

SUMMARY OF THE INVENTION

The present invention provides an apparatus and method capable of reducing the lead-in time of a disc on which data is always recorded and detecting a tilt of the disc exactly.

According to an aspect of the invention, there is provided an apparatus for detecting tilt of a disc, including a pickup recording data on the disc and reproduces data from the disc; and a system controller detecting a tilt of the disc by a zone while moving the pickup.

According to an aspect of the present invention, if a seek command is received after a lead-in operation of the disc has been performed, the system controller detects the tilt of the disc.

According to an aspect of the present invention, the system controller detects the tilt of the disc once in each zone.

According to an aspect of the present invention, the system controller detects the tilt using a difference between focus driving (focus of drive; FOD) signals for the pickup.

According to an aspect of the present invention, that the system controller detects a tilt at an inner area of the disc during a lead-in operation of the disc.

According to an aspect of the present invention, the disc is a DVR-R/RW.

According to an aspect of the present invention, the apparatus further includes a memory storing the detected tilt information, and the system controller confirms a zone of the disc in which the pickup is located if the seek command is received, detects the tilt if tilt information of the confirmed zone is not stored in the memory, and does not detect the tilt if the tilt information of the confirmed zone is stored in the memory.

According to another aspect of the invention, an apparatus for detecting a tilt of a disc, includes a pickup recording data on the disc and reproducing data from the disc; an RF amplifier generating an RF signal, a tracking error (TE) signal, and a focus error (FE) signal, using an output signal of the pickup; a servo signal processing unit, which outputs a tracking driving (tracking of drive: TOD) signal and an FOD signal for the pickup using the TE signal and the FE signal output from the RF amplifier; a tracking driving unit controlling tracking of the pickup according to the TOD signal output from the servo signal processing unit; a focus driving unit controlling focusing of the pickup according to the FOD signal output from the servo signal processing unit; and a system controller detecting a tilt of the disc by a zone using the FOD signal output from the servo signal processing unit while moving the pickup by controlling the servo signal processing unit if a seek command is received.

According to an aspect of the present invention, the apparatus further includes a data processor decoding the RF signal output from the RF amplifier, and if the seek command is received, the system controller checks a present position of the pickup based on the decoded data received from the data processor and detects a tilt in a zone of the disc against the present position of the disc.

According to another aspect of the invention, there is a method of detecting a tilt of a disc, including checking a position of a pickup facing the disc, if a seek command is received; confirming a zone of the disc faced by the pickup using the position of the pickup; and detecting the tilt of the zone of the disc, if tilt information of the zone of the disc is not stored.

According to an aspect of the present invention, the method is performed until the pickup reaches a target position in response to the seek command.

According to an aspect of the present invention, the detecting the tilt is performed using a difference between FOD signals against the pickup.

According to an aspect of the present invention, the disc is a DVR-R/RW.

According to another aspect of the invention, there is a method of detecting a tilt of a disc, including checking a position of a pickup facing the disc, if a seek command is received; confirming a zone of the disc facing the pickup using the position of the pickup; if tilt information of the zone of the disc is not stored, detecting and storing the tilt of the zone of the disc; if the tilt information of the zone of the disc is stored, not detecting the tilt of the zone of the disc; and repeatedly performing the detecting/storing the tilt and the not-detecting the tilt until the pickup reaches a target position of the disc.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more readily appreciated from the following descriptions of the embodiments taken in conjunction with the accompanying drawings in which.

DETAILED DESCRIPTION OF THE PREFERRED EMBODIMENTS

Figure 1:
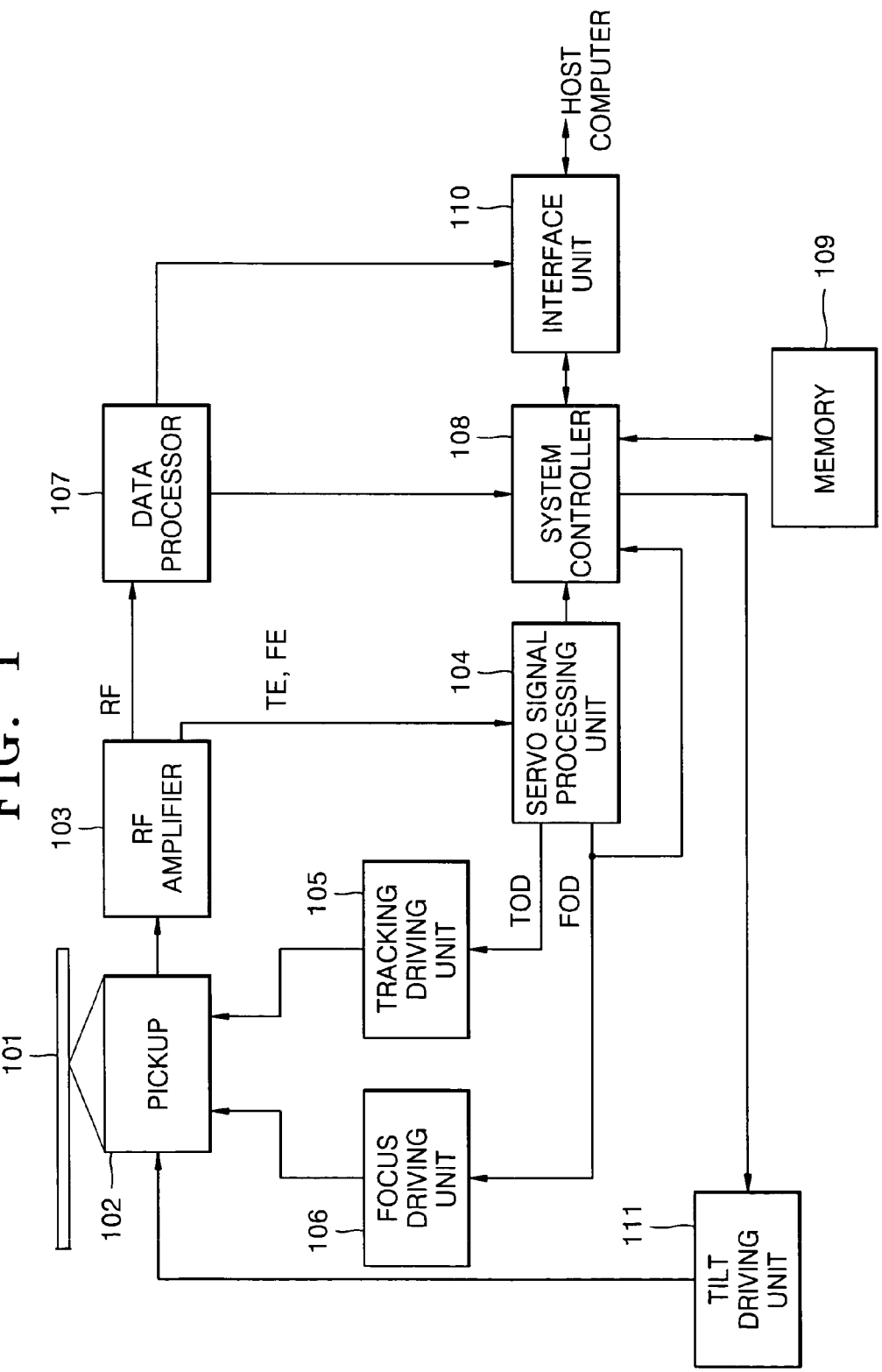
FIG. 1 is a block diagram of a disc drive having an apparatus to detect tilt of a disc according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a disc drive having an apparatus for detecting tilt of a disc according to the invention. Referring to FIG. 1, the disc drive includes a disc 101, a pickup 102, an RF amplifier 103, a servo signal processing unit 104, a tracking driving unit 105, a focus driving unit 106, a data processor 107, a system controller 108, a memory 109, an interface unit 110, and a tilt driving unit 111.

Even if the disc 101 is a blank disc having no user data, data is recordable on the disc 101. For example, the disc 101 may be a DVD-R/RW-type. If the disc 101 is a DVD-R/RW, data is recorded in a control data zone of a lead-in area of the disc 101. Addresses of the disc 101 are formed in sectors.

The pickup 102 is disposed to face a surface of the disc 101. The pickup 102 can record data on the disc 101 and or reproduce data from the disc 101 by emitting a laser light beam onto the disc 101 and detecting reflected light from the disc 101. For example, if the disc drive is set to a seek mode, the pickup 102 detects the reflected light from the disc 101, converts the detected reflected light into an electrical signal, and outputs the electrical signal to the RF amplifier 103.

The RF amplifier 103 generates an RF signal, a tracking error (TE) signal, and a focus error (FE) signal, using the electrical signal output from the pickup 102. The generated RF signal is output to the data processor 107, and the TE signal and the FE signal are output to the servo signal processing unit 104.

The servo signal processing unit 104 generates a tracking driving (tracking of drive: TOD) signal and a focus driving (focus of drive: FOD) signal using the TE signal and the FE signal received from the RF amplifier 103.

The tracking driving unit 105 controls tracking of the pickup 102 according the TOD signal received from the servo signal processing unit 104. That is, the tracking driving unit 105 moves the pickup 102 in the tracking direction in response to the TOD signal.

The focus driving unit 106 controls focusing of the pickup 102 according to the FOD signal received from the servo signal processing unit 104. That is, the focus driving unit 105 moves the pickup 102 in the focusing direction in response to the FOD signal.

The data processor 107 converts the RF signal received from the RF amplifier 103 into a digital signal, decodes the RF signal converted into the digital signal, and transmits the decoded signal to the system controller 108 and the interface unit 110.

The system controller 108 detects a rough tilt and a fine tilt at an area of the disc 101 during a lead-in operation of the disc 101. For example, the detecting occurs at an inner area of the disc 101.

After the lead-in operation of the disc 101 is complete, if a seek command is received through the interface unit 110, the system controller 108 detects a tilt of the disc 101 in a zone while controlling the servo signal processing unit 104 to move the pickup 102 in the tracking direction. The zones on the disc 101 are predetermined. For example, the tilt of the disc 101 is detected by dividing the total area of the disc 101 into five zones and placing physical addresses for the five zones of the disc 101 in the system controller 108.

Therefore, if a seek command is received through the interface unit 110, the system controller 108 detects a present position of the pickup 102 based on the decoded signal received from the data processor 107. The present position of the pickup 102 is the physical address formed in the disc 101. In other words, the physical address of the disc 101 included in the decoded signal becomes present position information of the pickup 102.

The system controller 108 checks a zone of the disc 101 corresponding to the present position information of the pickup 102. That is, the system controller 108 checks a zone of the disc 101 in which the pickup 102 is located by comparing the predetermined zone information of the disc 101 with the present position information of the pickup 102.

When the system controller 108 has confirmed a zone of the disc 101 in which the pickup 102 is located, the system controller 108 determines whether tilt information of the confirmed zone is stored in the memory 109. If the tilt information of the confirmed zone is not determined to be stored in the memory 109, the system controller 108 detects the tilt of the corresponding zone using a difference between FOD signals output from the servo signal processing unit 104. Here, the FOD signals are generated by signals picked up from two predetermined sampling points in the corresponding zone of the disc 101.

The system controller 108 stores the detected tilt information in the memory 109.

However, after the system controller 108 has confirmed a zone of the disc 101 in which the pickup 102 is located, if the tilt information of the zone is stored in the memory 109, the system controller 108 does not detect the tilt of the corresponding zone.

The tilt detection operation of the system controller 108 described above is repeatedly performed for each zone until the pickup 102 reaches a target position. If the seek command is to detect a tilt of a total area of the disc 101, the target position is in a lead-out area of the disc 101.

After the lead-in operation of the disc 101 is finished, if a seek command is received, the system controller 108 detects a tilt of the disc once in each zone and does not repeat tilt detection in zones in which the tilt has already been detected.

If the tilt is detected, when the system controller 108 performs a seek mode of a corresponding zone, the system controller 108 controls the tilt driving unit 111 to correct the tilt of the disc 101 using the detected tilt information. Control of the tilt driving unit 111 using the detected tilt information is performed while the pickup 102 is moving to detect a tilt of the next zone.

The memory 109 stores the tilt information of the disc 101 detected by the system controller 108 so that tilt information in every zone is assigned.

The interface unit 110 interfaces between a user interface device, i.e., a host computer (not shown), and the disc drive so that data is transmitted and received between the user interface device and the disc drive. If a data request signal is received from the user interface device, the interface unit 110 transmits the decoded signal received from the data processor 107 to the user interface device. Also, if a seek command is received from the user interface device, the interface unit 110 transmits the seek command to the system controller 108.

The tilt driving unit 111 drives the pickup 102 so that the tilt of the pickup 102 is adjusted according to the tilt information supplied from the system controller 108.

Figure 2:
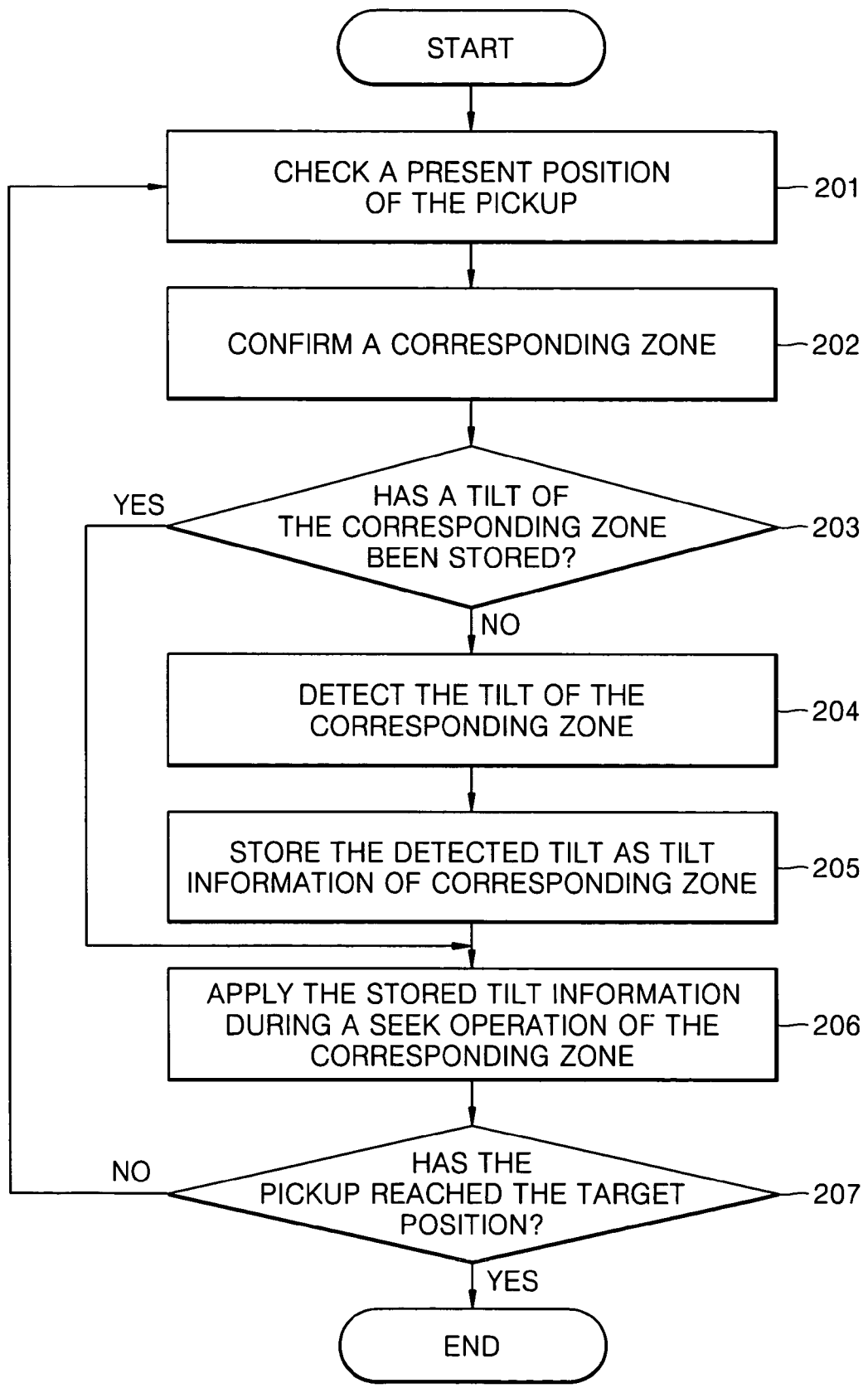
FIG. 2 is a flowchart of a method of detecting tilt of a disc according to an embodiment of the invention.

FIG. 2 is a flowchart of a method of detecting tilt of a disc according to the present invention. In particular, FIG. 2 is a flowchart of the method of detecting tilt of the disc, wherein a seek command is received after a lead-in operation of the disc 101 is performed.

When a seek command is received from a host computer (not shown), the system controller 108 checks a present position of the pickup 102 in operation 201. The position of the pickup 102 is confirmed using a physical address of the disc 101, as explained in the above description of FIG. 1.

A zone of the disc 101 at or against the pickup 102 is confirmed using the position of the pickup 102 in operation 202. The zone is set as explained in the above description of FIG. 1.

In operation 203, it is determined whether tilt information of the zone of the disc in which the pickup 102 is located is stored in the memory 109. This confirms whether the tilt of the zone has been detected. If it is determined in operation 203 that the tilt information of the zone has not been stored in the memory 109, this indicates that the tilt of the zone has not been detected. If it is determined in operation 203 that the tilt information of the zone has been stored in the memory 109, this indicates that the tilt of the zone has already been detected.

If the tilt information of the zone has not been stored in the memory 109 in operation 203, the system controller 108 checks a tilt of the corresponding zone of the disc 101 in operation 204. The tilt detection is performed using a difference between FOD signals output from the servo signal processing unit 104 in the corresponding zone.

The detected tilt information is stored in the memory 109 as the tilt information of the corresponding zone in operation 205.

In operation 206, the pickup 102 is controlled so that the tilt of the pickup 102 is adjusted using the detected tilt information during a seek operation of the corresponding zone. That is, the pickup 102 is driven by the tilt driving unit 111 so that the tilt of the pickup 102 is corrected using the detected tilt information before the pickup 102 reaches the next zone of the disc 101.

In operation 207, it is determined whether the pickup 102 has reached a target position according to the seek command. If it is determined that the pickup 102 has not reached the target position, the process returns to operation 201. Accordingly, the tilt of the disc 101 is detected once in each set zone of the disc 101. The target position is the same as explained in the above description of FIG. 1.

If the tilt information of the corresponding zone has been stored in the memory 109 in operation 203, the tilt detection process of the corresponding zone is not performed, and operation 206 is performed.

According to the invention, during performance of a lead-in operation of a disc, a tilt of the disc is detected in an inner area of the disc, the tilt is only detected when a seek command is received after the lead-in operation has been finished. Accordingly, the lead-in time of a disc such as a DVD-R/RW is reduced.

While the invention has been particularly shown and described with reference to a few embodiments thereof, it will be appreciated by those skilled in the art that changes in form and details may be made therein without departing from the principles and spirit of the invention, the scope of which is defined in the claims and their equivalents.

What is claimed is:

1. An apparatus to detect a tilt of a disc, comprising:
   a pickup to record data on the disc and reproduce data from the disc; and
   a system controller to detect the tilt of the disc corresponding to a zone while controlling a movement of the pickup, wherein the disc has a plurality of zones,
   wherein the system controller detects the tilt at an inner area of the disc only once during a lead-in operation of the disc, and
   the system controller only again detects the tilt of the disc if a seek command is received after a lead-in operation of the disc has been performed.

2. The tilt detecting apparatus of claim 1, wherein the system controller detects the tilt of the disc once in each zone.

3. The tilt detecting apparatus of claim 1, wherein the system controller detects the tilt using a difference between focus driving signals for the pickup.

4. The tilt detecting apparatus of claim 1, wherein the system controller detects a rough tilt and a fine tilt at an inner area of the disc during a lead-in operation of the disc.

5. The tilt detecting apparatus of claim 1, wherein the disc is a digital versatile disc-recordable/rewritable disc.

6. The tilt detecting apparatus of claim 1, wherein the system controller detects the tilt in the zone while simultaneously controlling the movement of the pickup in a tracking direction.

7. The tilt detecting apparatus of claim 1, wherein each of the plurality of zones of the disc is identified with a physical address such that a present position of the pickup is the physical address formed in the disc, each of the physical addresses is stored in the system controller.

8. The tilt detecting apparatus of claim 1, further comprising:
   a memory to store the detected tilt information,
   wherein the system controller confirms a zone of the disc that the pickup is located if a seek command is received, detects the tilt if tilt information of the confirmed zone is not stored in the memory, and does not detect the tilt if tilt information of the confirmed zone is stored in the memory.

9. The tilt detecting apparatus of claim 8, wherein if the system controller detects the tilt, the system controller detects the tilt of a corresponding zone of the disc and simultaneously adjusts the tilt of the disc using the detected tilt information.

10. The tilt detecting apparatus of claim 8, wherein if a total area of the disc is to be detected for tilt, the system controller detects the tilt of the disc until the pickup reaches a lead-out area of the disc.

11. The tilt detecting apparatus of claim 1, further comprising a tilt driving unit to drive the pickup so that the tilt is adjusted according to the tilt information.

12. The tilt detecting apparatus of claim 1, further comprising an RF amplifier generating an RF signal, a tracking error signal, and a focus error signal, using an output signal of the pickup.

13. The tilt detecting apparatus of claim 12, further comprising:
   a data processor to decode the RF signal output from the RF amplifier,
   wherein if a seek command is received, the system controller checks a present position of the pickup based on decoded data received from the data processor and detects the tilt in the zone of the disc located at the present position of the pickup.

* * * * *